United States Patent [19]
Liden

[11] 3,741,500
[45] June 26, 1973

[54] CMG FINE ATTITUDE CONTROL SYSTEM

[75] Inventor: Sam P. Liden, Phoenix, Ariz.

[73] Assignee: Sperry Rand Corporation, New York, N.Y.

[22] Filed: Apr. 21, 1971

[21] Appl. No.: 136,088

[52] U.S. Cl. ............. 244/1 SA, 33/226 Z, 74/5.34, 244/3.2, 244/79
[51] Int. Cl. ............................................. B64g 1/00
[58] Field of Search .................. 33/226 Z; 74/5.34, 74/5.6; 244/1 SS, 1 SA, 3.2, 3.21, 3.23, 79; 318/489

[56] References Cited
UNITED STATES PATENTS

| | | | |
|---|---|---|---|
| 3,329,375 | 7/1967 | Kurzhals et al. | 244/1 SA |
| 3,493,194 | 2/1970 | Kurzhals | 244/1 SA |
| 3,489,004 | 1/1970 | Barnhill et al. | 74/5.34 X |
| 3,547,381 | 12/1970 | Shaw et al. | 244/1 SA |
| 3,452,948 | 7/1969 | Kukel et al. | 244/1 SA |

Primary Examiner—Duane A. Reger
Assistant Examiner—Stephen G. Kunin
Attorney—S. C. Yeaton

[57] ABSTRACT

The invention teaches an attitude control system for providing control torques on a vehicle, such as a space satellite, using four single gimbal control moment gyroscopes. The relatively simple constant-gain steering law permits three axis control after failure of any one of the four control moment gyroscopes.

3 Claims, 5 Drawing Figures

INVENTOR
SAM P. LIDÉN
BY

ATTORNEY

INVENTOR
SAM P. LIDÉN
BY
ATTORNEY

3,741,500

A CMG FINE ATTITUDE CONTROL SYSTEM

BACKGROUND OF THE INVENTION

1. Field of the Invention

The invention relates to a configuration of control moment gyroscopes utilizing a relatively simple constant-gain steering law which permits three axis control after failure of one gyroscope.

2. Description of the Prior Art

Previous control moment gyroscope configurations can operate under simple control computations but require six single gimbal control moment gyroscopes. However, they do not provide or permit a fail operational configuration without considerable modification of the control computations. Other control moment gyroscope configurations may provide fail operational configurations with four or more single gimbal control moment gyroscopes, or three or more double gimbal control moment gyroscopes, but the control computations are highly complex. In addition, previously known gyro/gimbal configurations require one spare gyroscope for each primary gyroscope which duplicates the orientation of each primary gyroscope in order to maintain full operational capability after a failure of any of the primary gyroscopes.

SUMMARY OF THE INVENTION

In the four single gimbal fine attitude control system (4-FACS), the control moment gyroscopes (CMG's) are arranged in two pairs, where the two gimbal axes in each pair are parallel or collinear, and where the gimbal axes of one pair are typically perpendicular to the gimbal axes of the other pair. The gimbal axes lie in the yz-plane of the CMG system coordinates, with angles of 45°, 135°, 225° and 315° from the y-axis and counterclockwise about the x-axis. This configuration permits the use of a relatively simple constant gain steering law. The angular relationships between the gimbals and between the gimbal pairs may be modified if it is desired to modify the relative angular momentum capacity of the configuration, without unduly complicating the steering law.

In operation, both the magnitude and direction of the net angular momentum vector of the control moment gyro system is controlled by controlling the relative magnitude and direction of the resultant angular momentum of each pair of gyros, each pair being arranged as a scissored pair.

A primary object of the invention is to provide an attitude control system for a CMG controlled vehicle using a constant gain steering law.

Another object of the invention is to provide a CMG configuration wherein only minor modifications of the steering law are required when converting from a four gyro operation to a three gyro operation.

Another object of the invention is to provide a steering law easily modifiable to include additional tolerance control capability.

Another object of the invention is to provide a control moment gyroscope system capable of using the total available angular momentum of all gyroscopes in one axis.

Another object of the invention is to provide standby redundancy with only two additional gyros.

BRIEF DESCRIPTION OF THE DRAWINGS

A preferred embodiment of the present invention is illustrated in the accompanying drawings wherein.

DESCRIPTION OF THE PREFERRED EMBODIMENT

Space satellites are often required to maintain a fixed orientation while in orbit to accomplish the mission. Examples of such requirements may be that of positioning solar cells most favorably in relation to the sun, positioning a reflective antenna in respect to a transmitter and a receiver, or tracking objects by optical or electronic methods. The nature of these types of missions is that not only must corrections be made for gradual or relatively slow reorientation about one or more axes of the space vehicle or station due to external disturbances, but there must also exist a capability for rapid reorientation of the vehicle, for example, to permit a capture of a new tracking target. Thus, the control function must be capable of providing not only a high angular momentum, but controlling it with a great degree of precision.

Figure 1:
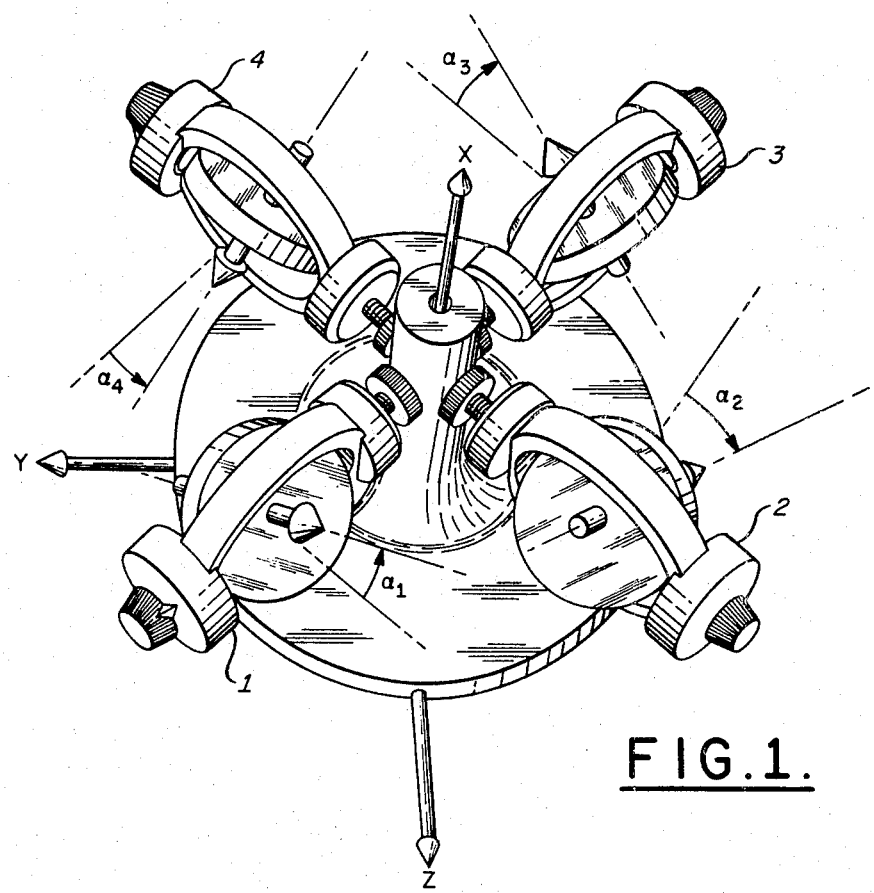
FIG. 1 is a schematic illustration of the CMG configuration and its orientation relative to a set of reference axes.

Referring to FIG. 1, which is a simple and convenient illustration of the gimbal orientation of the CMG's, there is shown a fine attitude control system consisting of four single-gimbal control moment gyroscopes (CMG's) arranged generally as two scissored pairs. Each gyro assembly comprises a high momentum rotor (not shown) journalled in a rotor bearing case or gimbal. As shown, the gimbal support axes in each pair are parallel or collinear and the gimbal axes of one pair are typically perpendicular to the gimbal axes of the other pair. The three axes shown, x, y, z correspond to the vehicle control axes, but not necessarily the conventional xyz axes of the vehicle. The gimbal axes as shown lie in the yz plane of the CMG coordinate system with angles of 45°, 135°, 225° and 315° from the y-axis, progressing counterclockwise about the x-axis. The angle between each pair of gimbal axes may be altered from the 90° configuration shown if it is desired to modify the relative angular momentum capacity of the configuration in the y and z axes. Additionally, the gimbal axis of each pair of gyros may be other than parallel to each other and still provide satisfactory operation under the steering law (to be discussed) of this system, however, additional coupling between axes is introduced and detracts from the optimum mode of operation. It is to be understood that the CMG's may be translated in any direction so long as the fixed angular relation to each other is maintained without departing from the scope of the invention.

Figure 2:
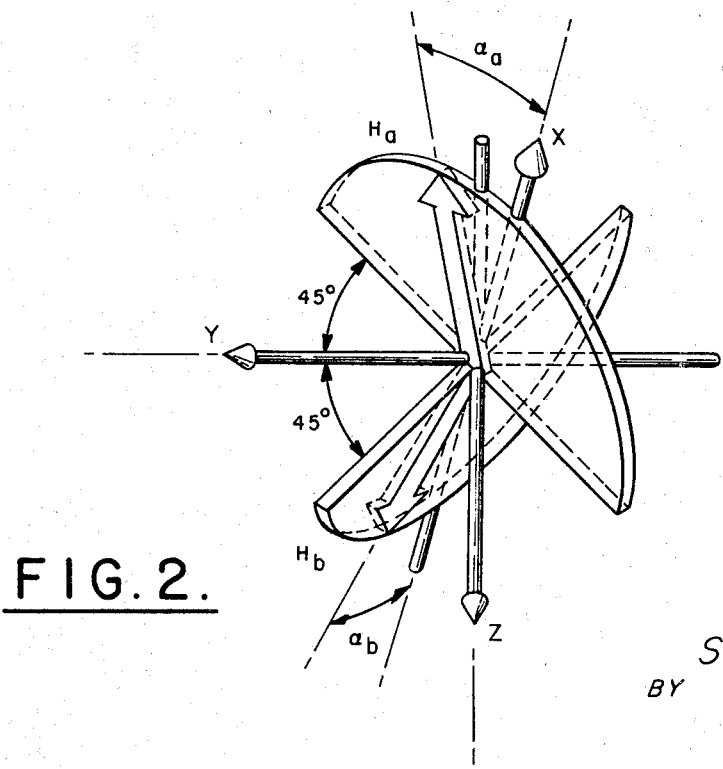
FIG. 2 is a diagram illustrating relative orientations of the CMG momentum vectors relative to the reference axes.

The angular momentum vectors of each of the CMG's depicted as emanating from the center of each rotor in FIG. 1 are referred to as h-vectors. The gimbal angles $\alpha = \{\alpha_1, \alpha_2, \alpha_3, \alpha_4\}$ are measured from the $yz$ plane to the respective $h$-vectors and enumerated in a counterclockwise direction about the $x$-axis. As shown for the initial gimbal angle condition, $\alpha_0$, the angles are $\alpha_{10} = 45°$, $\alpha_{20} = -45°$, $\alpha_{30} = 45°$, $\alpha_{40} = -45°$. FIG. 2 is a pictorial description of the steering law which controls angular momentum vectors of the CMG configuration shown. The explanation of the steering law may be simplified if each pair of gyroscopes having collinear axes are considered as a scissored pair. The angular momentum vector of gyros 1 and 3 is denoted as $H_a$ and that of gyros 2 and 4 by $H_b$. The orthogonal semicircular illustrations indicate the planes within which $H_a$ and $H_b$ may rotate, but it is to be understood that under certain modifications of the steering law, the vectors $H_a$ and $H_b$ may rotate more than 180°. For the initial gimbal angles, $\alpha_0$, $H_a$ lies in the $+x$ direction, $H_b$ lies in the $-x$ direction, and each has the magnitude of $\sqrt{2}\,h$, where $h$ is the angular momentum of each gyro (assuming all are equal). By expanding this proposition, the magnitude of $H_a$ is $2h \sin[(\alpha_1 + \alpha_3)/2]$ and $H_b$ is $2h \sin[(\alpha_2 + \alpha_4)/2]$, and the angles of $H_a$ from the $+x$ axis is $\alpha_a$, where $\alpha_a = (\alpha_1 - \alpha_3)/2$ and the angle of $H_b$ from the $-x$ axis is $\alpha_b$, where $\alpha_b = (\alpha_4 - \alpha_2)/2$.

In operation, the vectors $H_a$ and $H_b$ cooperate to produce the net angular momentum, which ultimately is used to reorient the space vehicle. When either $H_a$ or $H_b$ is changed in either magnitude or angular orientation, the net angular momentum is affected. In example, to produce a net angular momentum, $H$, in the $+x$ direction, starting from the initial condition of $\alpha_0$, the magnitude of $H_a$ is increased by increasing $\alpha_1$ and $\alpha_3$ by equal amounts and the magnitude of $H_b$ is decreased by increasing $\alpha_2$ and $\alpha_4$ by equal amounts. To produce $H$ in the $+y$ direction, $\alpha_a$ and $\alpha_b$ are increased by equal amounts and the magnitudes of $H_a$ and $H_b$ are held constant. To produce $H$ in the $+z$ direction, $\alpha_a$ is decreased and $\alpha_b$ is increased by an equal amount and the magnitudes of $H_a$ and $H_b$ are held constant. To produce an $H$ in a direction other than along a primary axis, combinations of the above movements are effected.

In a situation where one gyro has failed, the remaining gyro in that pair is reoriented such that its $H$ vector is in the same direction as the resultant $H$ of the original pair. This requires that the remaining gyro be reoriented to $+90°$ or $-90°$ (depending on which gyro has failed) in the initial condition, and thereafter performs the same over-all function as the original pair but with constant angular momentum rather than variable. The initial angles of the two gyros of the remaining pair must also be changed for the initial condition so as to maintain a balance between $H_a$ and $H_b$. Thus, the remaining gyros are reoriented to $\pm 30°$. The net angular momentum of the system as a whole is controlled by the steering law, as described above, except that only the intact pair can be changed in magnitude in the x direction.

Vehicle attitude may be controlled by controlling the net angular momentum of the CMG configuration, or by controlling its time derivative. In terms of the reference system described above, the projections, $H = \{H_x, H_y, H_z\}$, of the net angular momentum vector, $\vec{H}$, of the CMG system, onto the vehicle axes, are given by:

$$H_x = h(S_1 + S_2 + S_3 + S_4)$$
$$H_y = (1/\sqrt{2})\,h\,(-C_1 - C_2 + C_3 + C_4)$$
$$H_z = (1/\sqrt{2})\,h\,(C_1 - C_2 - C_3 + C_4) \quad (1)$$

where $h$ is the angular momentum magnitude of each gyro (all equal), and where $S_1 = \sin \alpha_1$, and $C_1 = \cos \alpha_1$, etc. The torque, $T = \{T_x, T_y, T_z\}$, produced by the CMG system on the vehicle is then given by $$T = -(\dot{H} + \Omega H) \quad (2)$$

where $\dot{H} = \{\dot{H}_x, \dot{H}_y, \dot{H}_z\}$, where $$\Omega = \begin{bmatrix} 0 & -\omega_z & \omega_y \\ \omega_z & 0 & -\omega_x \\ -\omega_y & \omega_x & 0 \end{bmatrix} \quad (3)$$

and where $\omega = \{\omega_x, \omega_y, \omega_z\}$ is the set of projections of the vehicle angular velocity vector $\vec{\omega}$, in inertial space, onto the vehicle axes.

A desired torque, $T$, can then be produced by the CMG system if $\dot{H}$ is controlled to follow a command, $\dot{H}_c$, given by $$\dot{H}_c = -(T_c + \Omega H) \quad (4)$$

where $T_c$ is the control torque commanded by some control law. $\Omega H$ can be computed by equations (3) and (1) from gimbal angles and body-rate signals, but in many important cases this term is so small that it can be ignored. In other cases it is preferable to command $\dot{H}_c$ instead of $T_c$. Taking the derivative of equation (1) yields $$\begin{bmatrix} \dot{H}_x \\ \dot{H}_y \\ \dot{H}_z \end{bmatrix} = h \begin{bmatrix} C_1 & C_2 & C_3 & C_4 \\ \dfrac{S_1}{\sqrt{2}} & \dfrac{S_2}{\sqrt{2}} & -\dfrac{S_3}{\sqrt{2}} & -\dfrac{S_4}{\sqrt{2}} \\ \dfrac{S_1}{\sqrt{2}} & \dfrac{S_2}{\sqrt{2}} & \dfrac{S_3}{\sqrt{2}} & -\dfrac{S_4}{\sqrt{2}} \end{bmatrix} \begin{bmatrix} \dot{\alpha}_1 \\ \dot{\alpha}_2 \\ \dot{\alpha}_3 \\ \dot{\alpha}_4 \end{bmatrix} \quad (5)$$

To control $\dot{H}$ so that it follows a commanded $\dot{H}_c$, a solution to equation (5) is required, but to compute an exact solution is quite complex. The following simple steering law computation yields an exact solution only when $\alpha = \{45°, -45°, 45°, -45°\} = \alpha_0$, and when the gimbal rate, $\dot{\alpha}$, exactly follows the commanded rate, $\dot{\alpha}_c$, but deviates from an exact solution otherwise:

$$\begin{bmatrix} \dot{\alpha}_{1c} \\ \dot{\alpha}_{2c} \\ \dot{\alpha}_{3c} \\ \dot{\alpha}_{4c} \end{bmatrix} = \dfrac{1}{h} \begin{bmatrix} \dfrac{\sqrt{2}}{4} & \dfrac{1}{2} & \dfrac{1}{2} \\ \dfrac{\sqrt{2}}{4} & -\dfrac{1}{2} & -\dfrac{1}{2} \\ \dfrac{\sqrt{2}}{4} & -\dfrac{1}{2} & \dfrac{1}{2} \\ \dfrac{\sqrt{2}}{4} & \dfrac{1}{2} & \dfrac{1}{2} \end{bmatrix} \begin{bmatrix} \dot{H}_{xc} \\ \dot{H}_{yc} \\ \dot{H}_{zc} \end{bmatrix} \quad (6)$$

Inserting equation (6) into equation (5) yields, when $\dot{\alpha} = \dot{\alpha}_c$, the actual $\dot{H}$ obtained under this simple steering law:

$$\begin{bmatrix} \dot{H}_x \\ \dot{H}_y \\ \dot{H}_z \end{bmatrix} = \begin{bmatrix} \frac{\sqrt{2}}{4}(C_1+C_2+C_3+C_4) & \frac{1}{2}(C_1-C_2-C_3+C_4) & \frac{1}{2}(-C_1-C_2+C_3+C_4) \\ \frac{1}{4}(S_1+S_2-S_3-S_4) & \frac{\sqrt{2}}{4}(S_1-S_2+S_3-S_4) & \frac{\sqrt{2}}{4}(-S_1-S_2-S_3-S_4) \\ \frac{1}{4}(-S_1+S_2+S_3-S_4) & \frac{\sqrt{2}}{4}(-S_1-S_2-S_3-S_4) & \frac{\sqrt{2}}{4}(S_1-S_2+S_3-S_4) \end{bmatrix} \begin{bmatrix} \dot{H}_{xc} \\ \dot{H}_{yc} \\ \dot{H}_{zc} \end{bmatrix} \quad (7)$$

When $\alpha = \alpha_0$, the above matrix equals the identity matrix. As disturbance torque integrals on the vehicle accumulate, $\alpha$ will wander away from $\alpha_0$ and the CMG system will produce cross-axis torques on the vehicle. When the gimbal angles are so different from $\alpha_0$ that the cross coupling becomes excessive, the CMG system is desaturated. In order to insure that the gimbal angles do not go to an unstable condition, mechanical and electrical stops are provided.

With one of the gyros failed, only one solution to equation (5) exists. The initial gimbal angles for the failed mode where gyro number $i$ has failed is $\alpha_0 = \{+30°, -30°, +30°, -30°\}$ except that gryo number $i \pm 2$ is chagned to $-(-1)_i \, 90°$, and gryo number $i$ is, of course, ignored. For example, if gyro number 3 has failed $\alpha_0 = \{90°, -30°, -, -30°\}$. The solution to equation (5) for $\alpha = \alpha_0$ with $\alpha_i = 0$ (where gyro number $i$ has failed) is given by:

$$\begin{bmatrix} \dot{\alpha}_{1c} \\ \dot{\alpha}_{2c} \\ \dot{\alpha}_{3c} \\ \dot{\alpha}_{4c} \end{bmatrix} = \frac{1}{h} \begin{bmatrix} \frac{1}{\sqrt{3}} & \frac{1}{\sqrt{2}} & -\frac{1}{\sqrt{2}} \\ \frac{1}{\sqrt{3}} & -\frac{1}{\sqrt{2}} & \frac{1}{\sqrt{2}} \\ \frac{1}{\sqrt{3}} & \frac{1}{\sqrt{2}} & \frac{1}{\sqrt{2}} \\ \frac{1}{\sqrt{3}} & \frac{1}{\sqrt{2}} & \frac{1}{\sqrt{2}} \\ \frac{1}{\sqrt{3}} & \frac{1}{\sqrt{2}} & \frac{1}{\sqrt{2}} \end{bmatrix} \begin{bmatrix} \dot{H}_{xc} \\ \dot{H}_{yc} \\ \dot{H}_{zc} \end{bmatrix} \quad (8)$$

except that the first term in row $i \pm 2$ is changed to zero and $\alpha_{ic} = 0$.

Reduction in cross-coupling torques is possbiel with more complicated steering law computations, but the described simple steering law is adequate in many cases, and is always stable for gimbal angles within 45° of the initial gimbal angles. The 4-FACS configuration has the inherent property that it permits simple steering laws.

Since the gimbal axes of each CMG pairs are parallel one additional CMG can serve as a standby for a failure in either of a pair, and two CMG's can serve as standbys for at least one failure in any of the four operating CMG's.

Figure 3:
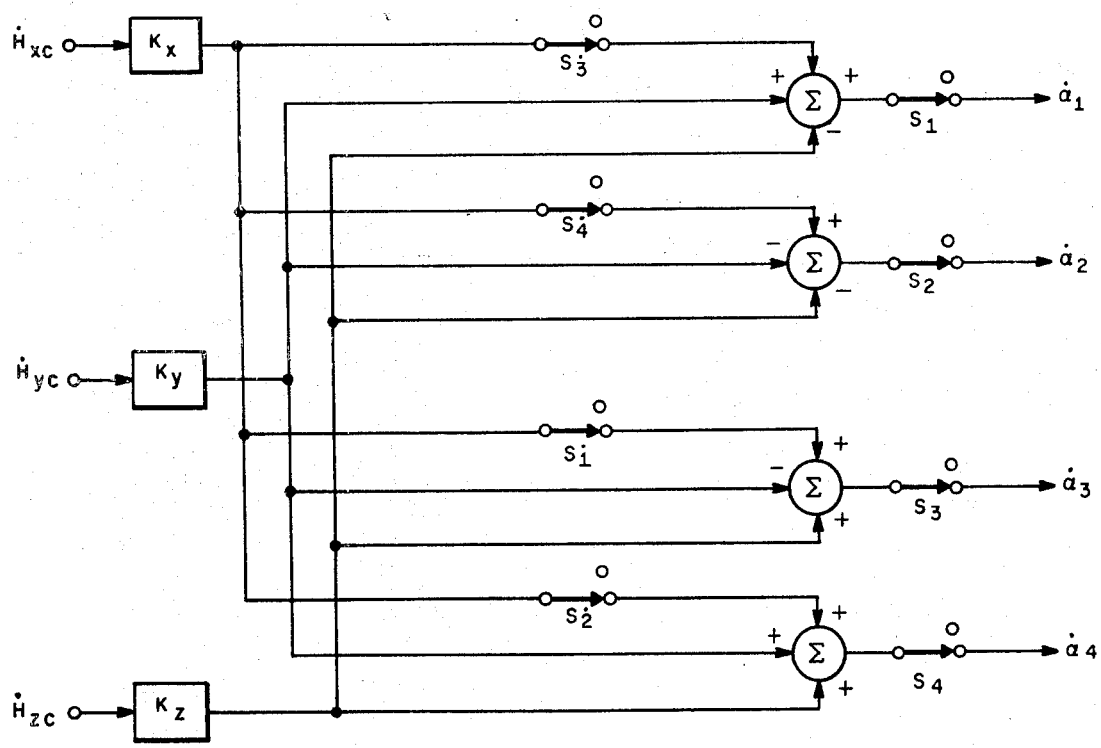
FIG. 3 is an electrical schematic illustrating an implementation of the steering law of the present invention.

The operation of the constant gain steering law presented above may be presented pictorially through the diagram of FIG. 3. With no failures, all the switches are closed and the commanded angular monemtum rates ($\dot{H}_{xc}, \dot{H}_{yc}, \dot{H}_{zc}$) for each axis are modified by the respective constant gain networks ($K_x, K_y, K_z$), where $K_x = \sqrt{2}/4$, and $K_y = K_z = \frac{1}{2}$ to produce the commanded angular rates ($\dot{\alpha}_1, \dot{\alpha}_2, \dot{\alpha}_3, \dot{\alpha}_4$) for each of the four CMG's. When a CMG fails, such as number $i$, switches $Si$ and $Si'$ are opened and the values of the respective constant gain networks are altered to $K_x = 1/\sqrt{3}$, and $K_y = K_z = 1/\sqrt{2}$. In changing from the no-failure mode to a one-failure mode, the gimbal angles must also be changed to the modified initial conditions, as previously described. The failed gyro should be de-spun to inhibit it from contributing or offsetting the effect of the remaining CMG's. The steering law modification due to failure may be further simplified by not changing the gains $K_x, K_y, K_z$. The resulting loss in the attitude control-loop gain will be reduced by 30 percent in the x-axis and 29 percent in the y and z-axis. In some applications such a loss of gain may be acceptable, and thereby simplify the computational operation of implementing the constant gain steering law.

Figure 4:
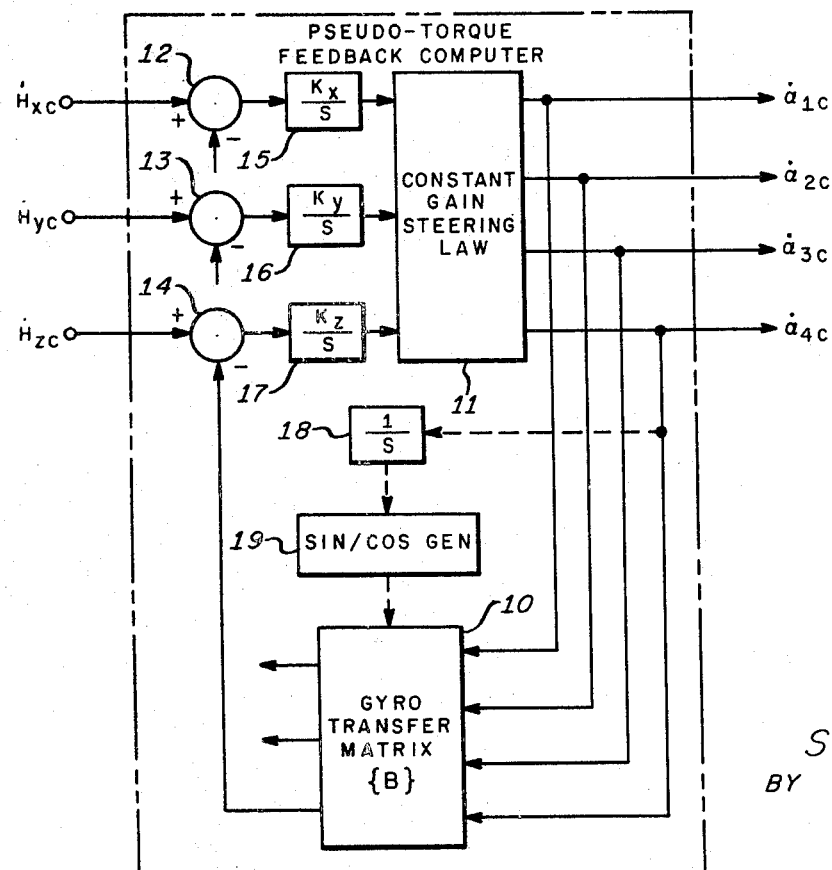
FIG. 4 is a schematic block diagram of an implementation of a modified steering law.

With the constant gain steering law, cross axis torques are produced under simultaneous multiple axis commands or when the system has absorbed disturbance angular momentum. In some applications. the vehcile outer control loop is sufficient to remove the attitude errors produced by such cross axis torques. When this is not sufficient, the constant gain steering law can be upgraded by the addition of feedback computations. The pseudo-torque feedback steering law effectively eliminates the cross coupling present with the constant gain law at the expense of added circuit complexity, as shown in FIG. 4. A linearized electronic analog of the CMG transforamtion (equation 5) is created by applying the commanded rates ($\dot{\alpha}_1, \dot{\alpha}_2, \dot{\alpha}_3, \dot{\alpha}_4$) to a gyro transfer matrix 10 $\{B\}$, which represents the gyro configuration. This matrix is a fucntion of the sine and cosine of the gyro gimbal angles. Therefore, the sine and cosine of each gimbal angle are computed through integrator 18 and sin/cos generator 19 to generate this transfer matrix 10. The matrix output is the electrically derived $\{\dot{H}\}$, or "pseudo-torque", representing the $\dot{H}$ applied to the vehicle. It is fed back to be compared with the commanded $\dot{H}$ at summers 12, 13, 14. If an error exists, integrators 15, 16, 17 correct the input to the constant gain steering law computer 11 so that a set of gimbal rates $\dot{\alpha}_{1c}, \dot{\alpha}_{2c}, \dot{\alpha}_{3c}, \dot{\alpha}_{4c}$ are obtained which create the desired torque combination.

This pseudo-torque feedback signal acts to correct the input to the constant gain steering law computer 11 instead of requireing the outer vehicle loop to make the necessary response. The torque feedback loop respone is adjusted to be much faster than the vehicle loop and gimbal loop response. The torque feedback loop, therefore, serves as a high bandwidth computer which rapidly solves for a correct set of gimbal rates in response to $\dot{H}_c$. The CMG gimbal rate loops are therefore presented with the correct commands to generate output torques without cross-coupling.

The electronic analog matrix {B} is linearized, except for trigonometric functions, and therefore, does not represent the gimbal loop non-linearitites. These differences between the analog model and the actual hardware may result in small cross-coupling torques which are removed by the outer vehicle loop. In applications where the gyro gimbal rate loop bandwidth is significantly higher than the vehcile loop bandwidth, the actual gimbal rates could be used to derive the pseudo-torques and hence include any non-linearities inherent in the CMG hardware. When the disturbances require a gimbal loop bandwidth approximately equal to the outer loop bandwidth, the pseuod-torque is derived as a function of commanded gimbal rates, as shown in FIG. 4, to attain a rapid response loop.

An alternate mechanization is to mount a resolver on each CMG gimbal and derive the $\dot{\alpha}_{ic} \sin \alpha_i$ and $\dot{\alpha}_{ic} \cos \alpha_i$ signals directly from the CMG gimbal angles. This technique eliminates entirely the need for computing non-linear trigonometric functions and multiplications. The practical range of operation for the gimbal angles under the above steering law is $\pm 40°$ about $\alpha_0$ when all four gyros are operating. The CMG system can then deliver approximately $\pm 1.82h$ in the x-axis and approximately $\pm 1.35h$ in the y or z-axes. The momentum envelope has approximately the shape of an octahedron with its six corners located on the coordinate axes. When CMG number 1 has failed, practical gimbal angle limits for CMG number 3 are at $\pm 85°$ about $\alpha_0 = 90°$ and for the other two, at $+25°$ and $-55°$ about $\alpha_0 = -30°$. The momentum envelope has a very irregular shape, intersecting the $+x$ axis at approximately $0.83h$, and the $-x$ at approximately $-0.99h$. The envelope peaks in the y and z directions are approximately located at $H_x = 0.75h$ and $H_y = H_z = \pm 1.21h$.

For certain applications it is possible to extend the envelope in the x-direction to almost $\pm 4n$ with four CMG's by some relatively simple modifications in the constant gain steering law (which is also the feed-forward portion of the pseudo-torque feedback steering law). In simple termns, such modifications amount to permitting $\alpha_1$ and $\alpha_3$ to go negative and $\alpha_2$ and $\alpha_4$ to go positive so that all four CMG angular momentum vecotrs can ultimately align in the same direction. The momentum envelope for the simplest forms of such a steering law modifications (polarity reversals and limiters) will, however, possess a "bottle neck" at about $|H_x| = 2h$ (or less). This bottle neck does not present a problem when the purpose for the vehicle attitude maneuvers is to attain various fixed attitudes; if the purpose is to track a moving attitude target, however, the momentum bottle neck may not be desirable. By further increasing the steering law complexity it is possible to eliminate the bottle neck effect.

The 4-FACS configuration is also suitable when a complex steering law, such as the pseudo inverse steering law with hangup avoidance, can be implemented, especially when most of the required angular momentum capacity is in one axis. Other configurations which require relatively complex steering law computations, cannot deliver all of their total angular momentum in one direction, as is possible with a 4-FACS configuration.

Figure 5:
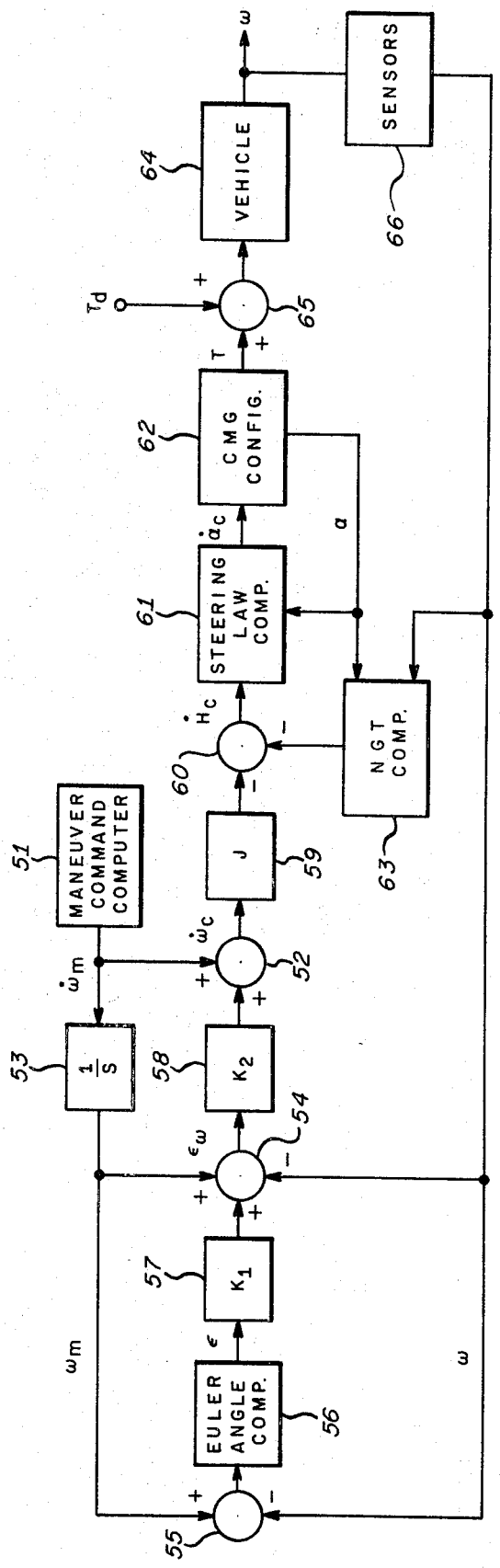
FIG. 5 is a block diagram of a complete vehicle control loop embodying the steering-law of the present invention.

The previously described steering laws may be implemented in a CMG attitude maneuvering control system as shown in FIG. 5. The maneuvering command computer 51 generates the vehicle acceleration commands for a desired maneuver. This command, $\dot{\omega}_m$, is fed to summer 52 and to integrator 53. The integrated acceleration command, or rate command $\omega_m$, is fed to summers 54 and 55. The vehicle rate $\omega$ is sensed by the vehicle attitude sensors depicted in unit 66 and also fed to summer 54 and 55. The output of summer 55 is fed to the Euler angle computer 56 which generates attitude error Euler-angles, $\epsilon$. The error Euler angle is operated upon by a gain network 57 and summed with the other inputs to summer 54. The output of summer 54 is operated upon by a gain network 58 and summed with the acceleration command in summer 52. The output of summer 52 is the commanded vehicle acceleration, $\dot{\omega}_c$ which is multiplied by the vehicle inertia 59 and fed to summer 60. The output of summer 60 represents the commanded net angular momentum rate, $\dot{H}_c$ to be acted upon by the steering law computer 61 such that the $\dot{H}$ of the CMG configuration approximates $\dot{H}_c$. The output of computer 61, as previously discussed, represents the commanded angular rate, $\dot{\alpha}_c$, for orienting the respective gimbals of the 4-FACS configuration. The actual gimbal angles of the CMG configuration 62 may be fed back to the steering law computer to correct for cross coupling effects if so desired. The net gyroscopic torque computer 63, responsive to both the vehicle angular rate and the gimbal angles of the CMG configuration, may be employed to provide additional input to summing junction 60 to further refine the commanded angular momentum rate but in many applications this signal is negligible. The output of the CMG configuration 62 represents a torque T on the vehicle 64, subject to being summed at summing junction 65 with any disturbance torques, $T_d$. Ultimately, the output of summer 65 represents the totality of the torques acting upon the vehicle to reorient the vehicle in response to a commanded maneuver.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. An attitude control system for controlling the attitude of a vehicle comprising
   a first pair of control moment gyroscopes,
   a second pair of control moment gyroscopes, wherein the gimbal axes of said first pair of control moment gyroscopes are essentially parallel, the gimbal axes of said second pair of control moment gyroscopes are essentially parallel, the net angular momentum vector of said first pair has a predetermined value at an initial condition that is equal and opposite to a corresponding predetermined value of the net angular momentum of said second pair,
   means for controlling the amplitude and direction of the net angular momentum of each of said pair of control moment gyroscopes from said initial condition, whereby the net angular momentum vector of the control system may be modified, and means for controlling the angular rate of each of the gimbals in said pairs of control moment gyroscope in accordance with a steering law of the form:

$$\begin{bmatrix} \dot{\alpha}_{1c} \\ \dot{\alpha}_{2c} \\ \dot{\alpha}_{3c} \\ \dot{\alpha}_{4c} \end{bmatrix} = 1/h \begin{bmatrix} 1 & 1 & -1 \\ 1 & -1 & -1 \\ 1 & -1 & 1 \\ 1 & 1 & 1 \end{bmatrix} \begin{bmatrix} K_x \dot{H}_{xc} \\ K_y \dot{H}_{yc} \\ K_z \dot{H}_{zc} \end{bmatrix}$$

wherein $\dot{\alpha}_c$ is the commanded gimbal rate of the identified gyro, $h$ is the angular momentum of each gyro, all equal, $\dot{H}$ is the commanded angular rate of the vehicle about the identified axis, $K_x, K_y, K_z$ are gain constants having values depending upon the angular orientations of the gyro gimbal axes relative to the identified vehicle axes.

2. An attitude control system for controlling the attitude of a vehicle comprising
 a first pair of control moment gyroscopes,
 a second pair of control moment gyroscopes, wherein the net angular momentum vector of said first pair has a predetermined value at an initial condition that is equal and opposite to a corresponding predetermined value of the net angular momentum vector of said second pair,
 means for controlling the amplitude and direction of the net angular momentum of each of said pair of control moment gyrocopes from said initial condition, whereby the net angular momentum vector of the control system may be modified, and
 means responsive to failure of any one of the gyroscopes for modifying said initial condition of the remaining gyro of the failed pair and that of the remaining pair of gyros.

3. The control system as claimed in claim 2 including means for controlling the angular rate of each of the operative gyros in said pairs of control moment gyroscopes in accordance with a steering law of the form $$\begin{bmatrix} \dot{\alpha}_{1c} \\ \dot{\alpha}_{2c} \\ \dot{\alpha}_{3c} \\ \dot{\alpha}_{4c} \end{bmatrix} = 1/h \begin{bmatrix} 1 & 1 & -1 \\ 1 & -1 & -1 \\ 1 & -1 & 1 \\ 1 & 1 & 1 \end{bmatrix} \begin{bmatrix} K_x' \dot{H}_{xc} \\ K_y' \dot{H}_{yc} \\ K_z' \dot{H}_{zc} \end{bmatrix}$$

wherein $\dot{\alpha}_c$ is the commanded gimbal rate of the identified gyro, $h$ is the angular momentum of each gyro, all equal, $\dot{H}$ is the commanded angular rate of the vehicle about the identified axis, and $K_x', K_y', K_z'$ are gain constants having values depending upon the angular orientations of the gyro gimbal axes relative to the identified vehicle axes and modified for a failed gyro, and wherein the row of the 4 × 3 matrix corresponding to the failed gyro is zero.

* * * * *